Jan. 7, 1964     N. B. GRANBERG     3,117,217
APPARATUS AND METHOD FOR SEMI-AUTOMATIC
WELDING LONG SEAMS

Filed Nov. 16, 1961     2 Sheets-Sheet 1

INVENTOR.
NEIL B. GRANBERG

BY Howard J. Barnett
ATTORNEY

Jan. 7, 1964   N. B. GRANBERG   3,117,217
APPARATUS AND METHOD FOR SEMI-AUTOMATIC
WELDING LONG SEAMS
Filed Nov. 16, 1961   2 Sheets-Sheet 2

INVENTOR.
NEIL B. GRANBERG
BY Howard J. Barnett
ATTORNEY 3,117,217
APPARATUS AND METHOD FOR SEMI-
AUTOMATIC WELDING LONG SEAMS
Neil B. Granberg, Wauwatosa, Wis., assignor to A. O.
Smith Corporation, Milwaukee, Wis., a corporation of
Wisconsin
Filed Nov. 16, 1961, Ser. No. 152,848
10 Claims. (Cl. 219—130)

This invention is directed to an apparatus and method for welding long seams, and more particularly to a conveyor system for physically transporting a welding operator alongside a workpiece to enable him to rapidly deposit a continuous and uniform long weld seam thereon.

There are many fabrication jobs where the necessity for a manually applied weld, completely free of defects, is required. This is particularly true where the article being fabricated is used to contain a fluid, and in this situation, the weld seams must be leak tight.

Where design of the fluid container requires long, manually welded, leak-tight seams, there is immediately created a fixturing problem for the welding apparatus, because the average weldor cannot produce a satisfactory weld while walking along the workpiece.

If the handwelding is to be accomplished economically, it is necessary to provide relative motion between the weldor and the workpiece. The fixturing problem becomes particularly acute if it is impractical to move the workpiece to provide the necessary relative motion between the weldor and the workpiece.

This invention solves the fixturing problem by providing a conveyor which is actuated in response to the welding arc to transport the weldor along the workpiece at a constant distance therefrom, and at a constant or variable speed to enable the weldor to deposit a continuous, uniform, leak-tight weld.

In the preferred embodiment of the invention, the conveyor is electrically actuated, taking advantage of the magnetic field induced around the electric current carrying cables of the welding apparatus when an arc is established. A relay is energized by the magnetic field, and energizing of the relay energizes a timer which then energizes the conveyor motor after a time delay. The timer prevents the motor from immediately driving the conveyor, and thereby avoids a jogging action of the conveyor if the arc goes out immediately, since the conveyor will not start moving until the arc has been solidly established.

The invention combines the advantages of obtaining a superior manual long weld seam with the economic advantages of a semi-automated welding operation, so that manual welds can be deposited rapidly which are consistently good in quality.

The best mode presently contemplated for carrying out the invention illustrated in the accompanying drawings and the following detailed description of the invention.

Figure 1:
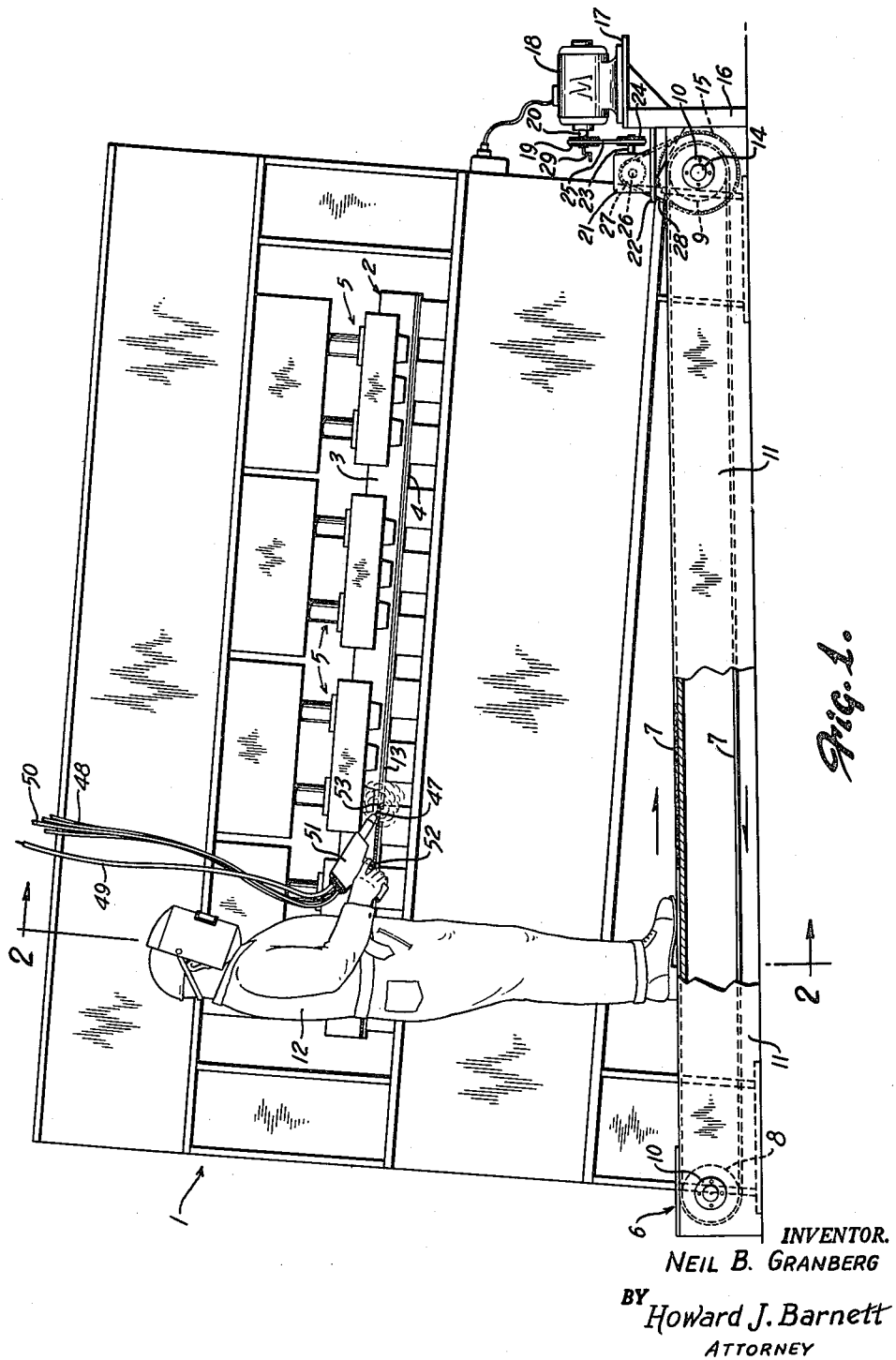
FIGURE 1 is a side plan view of the welding fixture and the conveyor system.
Figure 2:
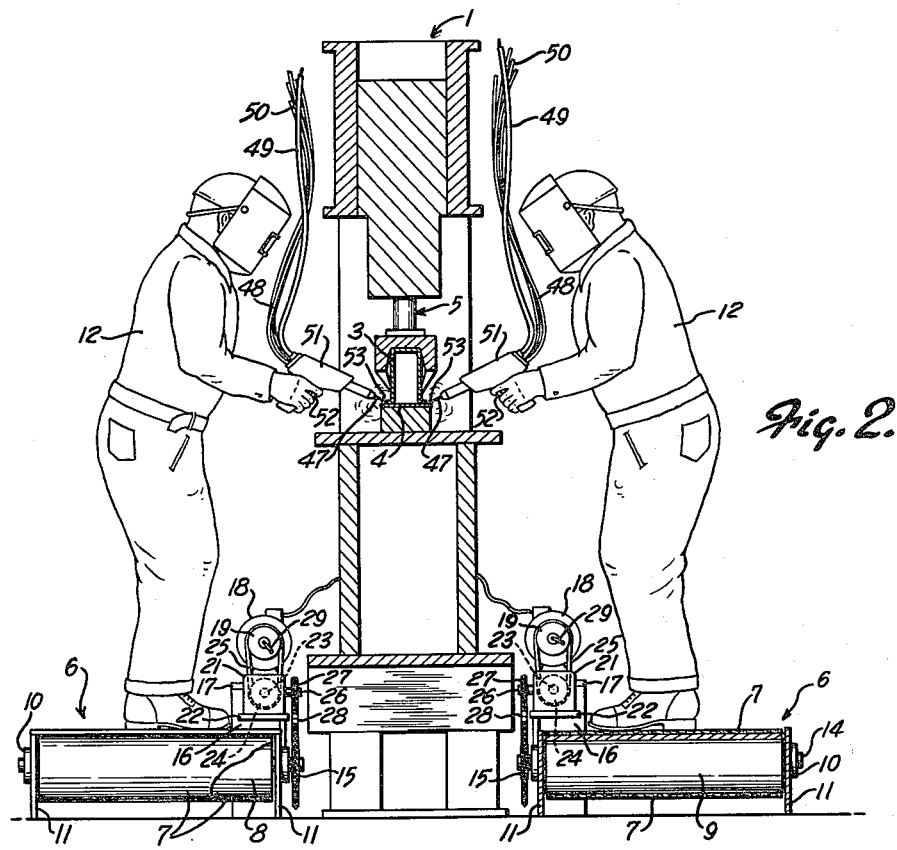
FIG. 2 is an end view of the welding fixture and the conveyor system.
Figure 3:
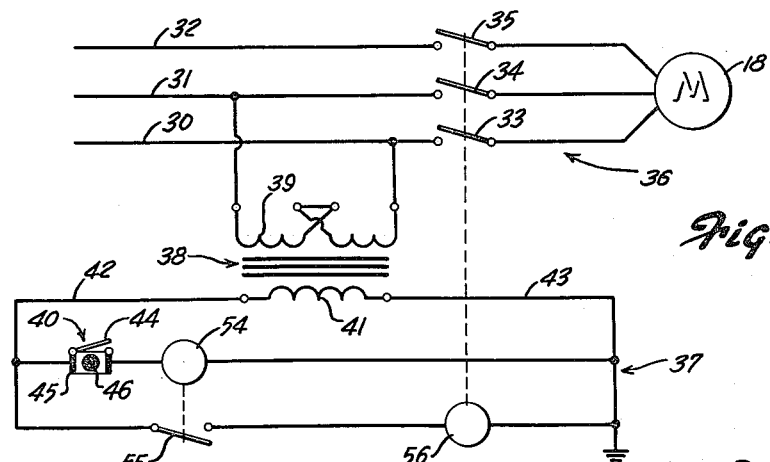
FIG. 3 is a diagram of the electrical circuit for actuating the conveyor.

As shown in the drawings, the welding fixture 1 is adapted to hold a workpiece 2 which, in this case, comprises a long hat section member 3 and a matching plate member 4. The workpiece 2 is held in the welding fixture 1 by means of hydraulic clamps 5.

A conveyor assembly 6 is located on each side immediately adjacent the welding fixture. Each conveyor assembly 6 includes an endless belt 7 mounted on rollers 8 and 9, which support the belt. The rollers 8 and 9 are rotatably mounted in journals 10 on a frame 11 at a level sufficiently below the workpiece 2 so that the belt 7 will provide a platform for a weldor 12 to stand on while welding a seam 13 on the workpiece. The roller 9 has a shaft 14 extending axially therefrom, on which is mounted a sprocket 15. A motor mounting frame 16 is rigidly secured to the end of the frame 11 above the roller 9 and the sprocket 15.

A bracket 17, which is welded to the top portion of the mounting frame 16, supports an electric motor 18 which is resiliently disposed thereon. A rotatable pulley 19 is disposed on a shaft 20 of the motor 18.

A reduction gear unit 21 is mounted on a second bracket 22, also welded to the mounting frame 16, and the reduction gear unit includes a driven shaft 23 and a pulley 24 secured to the shaft 23. A V-belt 25 extends around the pulleys 24 and 19 to drive the reduction gear unit 21 from the motor 18.

The reduction gear unit 21 also has a drive shaft 26, on which is mounted a sprocket 27. A chain 28 extends around the sprockets 27 and 15 to drive the roller 9 and the endless belt 7 from the reduction gear unit 21.

The pulley 19 on the motor shaft 20 has an adjustment means 29 for varying its effective diameter, and thereby changing the drive speed of the V-belt 25 through the reduction gear unit 21. The speed adjustment is made as required to adjust the speed of the conveyor belt 7 to conform to the welding conditions.

The motor 18 is 3-piece connected to power lines 30, 31, and 32 through contacts 33, 34 and 5 in a motor circuit 36.

A control circuit 7 is connected to the motor circuit 36 by a transformer 38 having the primary winding 39 connected across two of the three incoming power lines 30 and 31.

A coil-less relay 40 is connected with the transformer secondary winding 41 through leads 42 and 43. The coil-less relay 40 is open construction, having contacts 44 and a frame 45 frabricated from a low loss silicon steel.

A welding cable 46 is passed through the frame 45 of the relay 40 and the welding cable acts as a single turn coil, causing the relay contacts 44 to close when current flows through the cable 46 incident to striking an arc.

The weldor 12 operates a welding apparatus which includes a consumable electrode 47, shielding gas conduits 48, an electrode feed cable 49, power cable 50, and a manual welding gun 51, which has a trigger contact 52 to cause power to flow through the cable 46 when the weldor strikes an arc 53.

The sensitivity of the relay 40 can be adjusted so that it will respond at a given minimum current flow as desired, adjusted for the particular welding apparatus.

The leads 42 and 43 also feed a timer relay coil 54 which is energized when the relay 40 closes. The timer relay coil 54 then actuates a normally open timer relay contact 55 which closes after a timed period to energize a holding coil 56. The holding coil 56 closes the contacts 33, 34 and 35 in the motor circuit 36, providing current to drive the motor 18 and the conveyor belt 7.

As long as the arc continues, and current flows through the cable 46, the relay 40 will remain closed and the motor 18 will continue to operate, driving the conveyor belt 7 to carry the weldor 9 along the workpiece 2 at a predetermined speed so that he can apply a smooth, continuous weld seam 13 to the workpiece 2. When the weldor 12 completes the weld seam 13, he releases trigger contact 52 on the welding gun 51, thereby opening the welding circuit and extinguishing the arc 53. Current flow through the cable 46 ceases, and the relay 40 is de-energized to de-energize the motor circuit 36 and stop the conveyor belt 7.

After the weldor has released clamps 5 and unloaded the workpiece 2 from the welding fixture 1, he reloads the fixture with a new workpiece 2 to be welded, and takes his starting position at the end of the belt 7. He then strikes the arc 53 to resume welding, and is again smoothly conveyed along the workpiece as he welds, enabling him to maintain a smooth arc and lay a uniform and continuous weld seam.

Each weldor can adjust the speed of his respective conveyor belt 7 to the rate at which he can weld effectively. It is desirable to synchronize the welding operation on both sides of the workpiece 2, and thereby obtain optimum production volume.

The apparatus and method of this invention provide an economical means for obtaining a high quality continuous, leak-tight long weld seam by automatically transporting a weldor smoothly along the seam to be welded.

Various modes of carrying out the invention are contemplated as being within the scope of the following claims particularly pointing out and distinctly claiming the subject matter which is regarded as the invention.

I claim:

1. A welding apparatus for semi-automatic welding of long weld seams comprising, a manually operated welding apparatus including a hand-held welding gun, conveyor means for conveying a weldor holding said hand-held welding gun alongside a workpiece in proximity thereto, and means responsive to the flow of welding current in the welding apparatus upon initiation of a welding arc by said weldor to actuate the conveyor means to convey the weldor alongside the workpiece.

2. A welding apparatus for semi-automatic welding of long weld seams comprising, a manually operated welding apparatus including a hand-held welding gun, conveyor means for conveying a welding operator holding said hand-hold welding gun alongside a workpiece in proximity thereto, drive means responsive to the flow of welding current in the welding apparatus to actuate the conveyor means to convey the welding operator alongside the workpiece, and timing means operably connected to said drive means for delaying the response of said drive means to the flow of welding current to thereby assure actuating the conveyor only after a steady arc has been established.

3. A welding apparatus for semi-automatic welding of long weld seams comprising, a manually operable, hand-held, electric arc welding apparatus, conveyor means for conveying a welding operator holding said hand-held welding apparatus alongside the seam to be welded, switch means responsive to the flow of arc welding current in the arc welding apparatus, and drive means operably connected with said switch means for driving said conveyor, said drive means being actuated by said switch means after commencement of the flow of arc welding current to drive the conveyor during flow of welding current.

4. A semi-automatic, manually controlled, electric apparatus for performing work on a workpiece comprising, a hand-held electric tool, conveyor means for conveying an operator holding said hand-held electric tool alongside a workpiece at a relatively constant distance therefrom to facilitate access to said workpiece by said operator while the operator is being conveyed along said workpiece, current carrying means connecting said electric tool to a source of power, said current carrying means functioning as an electromagnetic coil when current passes therethrough, a current relay responsive to the flow of current through said current carrying means and located in close proximity thereto, and contact means connected in an electrical circuit with said conveyor means, said contact means being responsive to the energizing of said current relay to complete the circuit to said conveyor means, thereby actuating said conveyor means to convey the electrical tool and said operator alongside the workpiece while performing work thereon.

5. A maunally operated welding apparatus having a hand operated welding nozzle and having a power supply cable, a motor, a conveyor to convey an operator and said hand operated welding nozzle alongside a workpiece to be welded, said conveyor being driven by said motor, a motor circuit having leads connected to a power source and to said motor to provide electrical energy to drive said motor, normally open contact means in said motor circuit to control the flow of electrical energy to said motor, a transformer having its primary winding electrically connected to said motor circuit, a control circuit having leads connected to the secondary winding of the transformer, a coil-less relay having a frame surrounding the power supply cable of said welding apparatus and electrically connected to said control circuit to energize said control circuit in response to the flow of electrical energy in said power supply cable, a timer relay coil in said control circuit responsive to the flow of current in the coil-less relay, a normally open timer relay contact which is operated by said timer relay coil and which closes after a timed period, a holding coil energized by the closing of the timer relay contact which causes said contact means to close in response to the flow of electrical energy through the power supply cable, thereby providing a conveyor which conveys said operator and said welding apparatus alongside a workpiece while electrical energy is flowing through the power supply cables in the welding apparatus.

6. The apparatus of claim 5 in which the hand operated welding nozzle includes a manually operated electrical switch to control the flow of electrical energy through said power supply cables.

7. A method of manually welding long seams on a stationary workpiece, the steps comprising, positioning a human operator on a conveyor in close proximity to the workpiece, striking an arc between said workpiece and a consumable arc welding electrode held by said human operator while standing on said conveyor, said electrode and said conveyor being manually controllable by said operator to effect simultaneous conveying of said operator along the seam to be welded as said operator manually arc welds the seam, moving said human operator along the workpiece, and enabling said human operator to simultaneously weld a long seam along said workpiece while said operator holding said electrode is being conveyed alongside said stationary workpiece.

8. A method of manually depositing long weld seams on a stationary workpiece comprising, taking a position on an endless belt conveyor having an electrical drive means, said conveyor being disposed in close proximity to the workpiece and having control means responsive to the flow of welding current in a hand-held, hand-operated arc welding gun, which control means starts said conveyor in response to the flow of welding current in said welding gun, striking an arc between said workpiece and a consumable electrode in said welding gun, simultaneously actuating said control means to start said conveyor and manually welding a long seam on said stationary workpiece while being simultaneously conveyed alongside the workpiece.

9. A process for performing manual work on a workpiece which comprises, disposing a manual worker on a conveyor, providing said manual worker with a hand operated tool having control means for controlling the motion of said conveyor in response to predetermined signals from said manual worker, and mechanically moving said worker in relation to said stationary workpiece in response to said predetermined signals from said control means in the hand operated tool held by said manual worker.

10. A method for semi-automatic welding of a manual weld seam by means of a human operator comprising, disposing a workpiece in a stationary fixture having the portion to be welded exposed, standing on a conveyor in proximity to the portion of the workpiece to be welded while simultaneously holding a manually operated arc welding gun, said gun including manually operable control means for operating said conveyor, commencing said manual arc welding on said workpiece, and simultaneously actuating said control means to cause said human operator holding said arc welding gun to be transported along the portion of the workpiece to be welded while manually depositing a weld seam thereon.

References Cited in the file of this patent
UNITED STATES PATENTS

| | | |
|---|---|---|
| 1,536,774 | Clarkson | May 5, 1925 |
| 1,827,245 | Lincoln et al. | Oct. 13, 1931 |